United States Patent [19]
Malmendier

[11] 3,883,358
[45] May 13, 1975

[54] COPPER ALUMINOBORATE GLASSES
[75] Inventor: Joseph W. Malmendier, Corning, N.Y.
[73] Assignee: Corning Glass Works, Corning, N.Y.
[22] Filed: July 22, 1974
[21] Appl. No.: 490,500

[52] U.S. Cl. .............................................. 106/47 R
[51] Int. Cl. ............................................. C03c 3/14
[58] Field of Search ........................ 106/47 R, 47 Q

[56] References Cited
UNITED STATES PATENTS
3,779,781  12/1973  Baak et al. ............................ 156/52

Primary Examiner—Winston A. Douglas
Assistant Examiner—Mark Bell
Attorney, Agent, or Firm—Clinton S. Janes, Jr.; Clarence R. Patty, Jr.

[57] ABSTRACT

The instant invention is concerned with the production of glasses in the copper borate composition field wherein $Al_2O_3$, though not required, is a very desirable additive. Such glasses exhibit low softening points and coefficients of thermal expansion ranging between about 30–50 × $10^{-7}$/°C. Those properties impart the special utility of enabling sealing to commercial alkali borosilicate glasses (and glasses of that expansion range) without deformation of the alkali borosilicate. The electrical properties of both the bulk and the surface glass can be altered through variations in oxidizing and reducing conditions. The compositions of the glasses in weight percent on the oxide basis, wherein copper is deemed to be present as CuO, range between about 25–55% CuO, 0–25% $Al_2O_3$, and 25–70% $B_2O_3$.

3 Claims, No Drawings

COPPER ALUMINOBORATE GLASSES

Copper aluminosilicate glasses are well-known to the art. U.S. Pat. No. 3,779,781 is a recent addition to that art and provides an excellent summary of the properties of those glasses and the uses to which such have been put. Hence, as is pointed out in that patent, those glasses exhibit low coefficients of thermal expansion (normally about $10 \times 10^{-7}/°C$. or lower) and softening points less than about 900°C. The low coefficient of thermal expansion has recommended their use for such optical devices as astronomical mirrors and as sealing glasses for fused quartz (coefficient of thermal expansion over the range of 0°–300°C. of about $5 \times 10^{-7}/°C$.). That patent also discusses the manner in which the oxidation state of the copper in the glass can be varied through control of temperature and environment of the melting and forming process and/or in a subsequent heat treating step.

Whereas such glasses have unquestioned utility, there has been the desire for copper-containing glasses having lower softening points and somewhat higher coefficients of thermal expansion such as to render them especially suitable for sealing to the commercially much-used alkali borosilicate glasses. The copper content permits the electrical properties of such glasses to be tailored to a wide spectrum of applications.

Therefore, the primary objective of the present invention is to provide copper-containing glass compositions which will exhibit coefficients of thermal expansion compatible with those demonstrated by alkali borosilicate glasses and softening points at lower temperatures than those of the latter glasses.

That objective can be accomplished utilizing copper-containing glasses consisting essentially, by weight on the oxide basis wherein the copper content is expressed as CuO, of about 25–55% CuO, 0–25% $Al_2O_3$, and 25–70% $B_2O_3$. Such glasses exhibit coefficients of thermal expansion (0°–300°C.) ranging between about 30–50 $\times 10^{-7}/°C$. and softening points less than about 700°C. In the preferred embodiment, the coefficient of thermal expansion (0°–300°C.) will range between about 30–40 $\times 10^{-7}/°C$. and the softening point will be less than about 650°C.

The inclusion of $Al_2O_3$ is of very practical significance in improving the melting and forming properties of the binary $CuO$-$B_2O_3$ glasses and to stabilize the glass against devitrification. Therefore, the preferred compositions will contain at least about 5% $Al_2O_3$. To enjoy the favorable effects of low expansion, coupled with low softening point, to the fullest extent, the glass composition will be held within the three component system. Nevertheless, minor amounts of compatible metal oxides can be tolerated for such purposes as melting and/or forming aids, fining agents, or to modify certain physical properties. For example, small amounts of alkali metal oxides and/or alkaline earth metal oxides can alter the viscosity characteristics of the basic three component system while simultaneously varying such physical properties as the coefficient of thermal expansion. $As_2O_3$ and $Sb_2O_3$ can act as fining agents. $SiO_2$ has a sharp tendency to harden the glass and lower the coefficient of thermal expansion thereof. Therefore, its essential absence from the glass composition is much to be preferred. In general, the total of all such optional additions ought not to exceed 10% and, preferably, will be maintained at a level less than 5%.

Table I reports a group of eleven glass compositions, in weight percent on the oxide basis, wherein copper oxide is expressed as CuO, falling within the effective composition parameters of the instant invention. The batch ingredients utilized can comprise any materials, either the oxides or other compounds, which, on being melted together, are converted to the desired oxides in the proper proportions. The batches were compounded with the components being blended together in a ball mill to aid in securing a homogeneous melt. The batches were thereafter placed in platinum or silica crucibles and those crucibles heated in an electrically-fired furnace for four hours at temperatures ranging from about 1,075°–1,550°C. with stirring. The melts did not appear to attack the silica to any substantial extent. On a cation basis, compositions containing copper ($CuO_{0.5}$) to boron ($BO_{1.5}$) ratios greater than 1:3 can be satisfactorily melted at 1,100°C. Good glass formation also appears to be limited to copper ($CuO_{0.5}$) to aluminum ($AlO_{1.5}$) ratios greater than about 1:3. The melts were cast into steel molds to yield slabs having dimensions of 5 inches × 5 inches × ½ inch. These molds with the slabs contained therein were immediately transferred to an annealer operating at about 500°–550°C. Commonly, the annealing step will be carried out overnight.

Table II records such physical properties as Softening Point, Annealing Point, and Melting Point, all obtained through Differential Thermal Analysis and reported in °C.; Log Resistivity in ohm-cm at 25°C.; and the Coefficient of Thermal Expansion over the range 0°–300°C.

TABLE I

|  | 1 | 2 | 3 | 4 | 5 | 6 | 7 | 8 | 9 | 10 | 11 |
|---|---|---|---|---|---|---|---|---|---|---|---|
| $B_2O_3$ | 66.1% | 55.7% | 44.5% | 47.5% | 55.4% | 29.1% | 38.3% | 47.2% | 38.6% | 47.4% | 39.6% |
| $Al_2O_3$ | 6.1 | 17.5 | 21.7 | 10.3 | 17.4 | 19.0 | 17.9 | 9.0 | 18.0 | 9.1 | — |
| CuO | 27.8 | 26.8 | 33.8 | 42.2 | 27.2 | 51.9 | 43.8 | 43.8 | 43.4 | 43.5 | 60.4 |

TABLE II

|  | 1 | 2 | 3 | 4 | 5 | 6 | 7 | 8 | 9 | 10 | 11 |
|---|---|---|---|---|---|---|---|---|---|---|---|
| Log Resist. | 15.0 | 15.0 | 15.0 | 13.1 | 15.0 | 13.9 | 15.0 | 15.0 | 14.6 | 14.3 | — |
| Coef. Exp. | 39.9 | 36.4 | — | — | 42.6 | 35.2 | 36.0 | 37.5 | 35.0 | 36.2 | 49.6 |
| Ann. Pt. | 360° | 430° | 450° | 455° | 490° | 490° | 480° | 470° | 465° | 450° | 550° |
| Soft. Pt. | — | — | — | — | — | 570° | 665° | 650° | 570° | 610° | — |
| Melt. Pt. | — | — | — | — | — | 900° | 900° | 900° | 900° | 920° | — |

($\times 10^{-7}/°C$.). The latter two groups of measurements were determined employing techniques conventional in the glass art.

The compositional parameters specified above for CuO, $Al_2O_3$, and $B_2O_3$ must be observed to produce glasses exhibiting the desired low softening point and coefficient of thermal expansion approximating that of the alkali borosilicate glasses such as to render them particularly useful as sealing glasses therefor. The presence of copper in the glasses makes them admirably suited to fusion by infrared radiation. Hence, where less than about 25% $B_2O_3$ is included in the batch, the glasses become difficult to form in good quality; whereas, with amounts greater than about 70%, the melts cool to form dark green opal glasses. Furthermore, when $Al_2O_3$ is present in the composition in excess of about 25%, the liquidus of the glass rises rapidly and hampers utilization of conventional glass handling techniques. Finally, at least about 25% CuO is required to produce stable glasses wherein a wide variation in electrical properties can be imparted through heat treatment of the glass. Quantities greater than about 55% involve substantial increases in cost with no significant improvement in properties. It should be observed that, when plotted on the cation basis, the useful regions of compositions in the $CuO-Al_2O_3-B_2O_3$ and $Cu_2O-Al_2O_3-B_2O_3$ fields are approximately coincidental.

Two examples demonstrating the effect of the heat treatment in oxidizing and reducing environments upon glasses of the instant invention are set forth below. The desired reactions proceed rather slowly at temperatures below the annealing point of the glass so the preferred practice contemplates treatments at temperatures above the annealing point but below the melting point of the glass. Each glass was compounded, melted, formed, and annealed in like manner to Examples 1–10 described above.

EXAMPLE 12

A glass having a composition on a cation percentage basis of 60% $BO_{1.5}$, 10% $AlO_{1.5}$, and 30% $CuO_{0.5}$ (approximately 47.4% $B_2O_3$, 10.3% $Al_2O_3$, and 42.2% CuO on the weight percentage basis) exhibited a log resistivity at 25°C. of 13.1 ohm-cm as formed.

After heat treatment in air at 700°C. for 30 minutes, the log resistivity at 25°C. measured 7.61 ohm-cm. This decrease in resistivity is believed due to the precipitation of CuO crystals in the glass. Where the heat treatment was conducted in a reducing atmosphere, viz., forming gas (80% nitrogen, 20% hydrogen), a copper metal skin was developed on the glass articles.

EXAMPLE 13

A glass having a composition on a cation percentage basis of 60% $BO_{1.5}$, 20% $AlO_{1.5}$, and 20% CuO (approximately 44.4% $B_2O_3$, 21.7% $Al_2O_3$, and 33.8% CuO on the weight percentage basis) exhibited a log resisitivity at 25°C. ohm-cm as formed.

After heat treatment in air at 700°C. for 30 minutes, the log resistivity at 25°C. was measured at 10.69 ohm-cm. Again, this drop in resistivity is believed to be caused by the growth of CuO crystals in the glass. Heat treatment in the forming gas reducing atmosphere resulted in the development of a copper metal skin on the glass.

I claim:

1. A copper-containing glass consisting essentially, by weight on the oxide basis wherein the copper content is expressed as CuO, of about 25–55% CuO, 0–25% $Al_2O_3$, and 40–70% $B_2O_3$.

2. A copper-containing glass according to claim 1 wherein the softening point thereof is less than about 700°C. and the coefficient of thermal expansion (0°–300°C.) will range between about 30–50 × $10^{-7}$/°C.

3. A copper-containing glass according to claim 1 which is essentially free from $SiO_2$.

* * * * *